(12) United States Patent
Lee et al.

(10) Patent No.: US 7,333,417 B2
(45) Date of Patent: Feb. 19, 2008

(54) INFORMATION STORAGE MEDIUM AND METHOD AND APPARATUS FOR RECORDING DATA ON AND/OR READING DATA FROM THE SAME

(75) Inventors: Kyung-geun Lee, Seongnam-si (KR); Jae-seong Shim, Seoul (KR); Chang-min Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 10/929,765

(22) Filed: Aug. 31, 2004

(65) Prior Publication Data

US 2005/0083806 A1 Apr. 21, 2005

(30) Foreign Application Priority Data

Sep. 8, 2003 (KR) .................. 10-2003-0062682
Oct. 11, 2003 (KR) .................. 10-2003-0070821

(51) Int. Cl.
*G11B 7/24* (2006.01)

(52) U.S. Cl. .................. 369/275.3; 369/94; 369/47.27

(58) Field of Classification Search ............. 369/275.3, 369/94, 47.27, 59.25
See application file for complete search history.

(56) References Cited

U.S. PATENT DOCUMENTS 6,934,236 B2 * 8/2005 Lee et al. ............... 369/53.22

FOREIGN PATENT DOCUMENTS

| JP | 06-020276 | 1/1994 |
|----|-----------|--------|
| JP | 2001-176071 | 6/2001 |
| KR | 2002-84671 | 11/2002 |
| KR | 2002-96857 | 12/2002 |

* cited by examiner

*Primary Examiner*—Thang V. Tran
(74) *Attorney, Agent, or Firm*—Stein, McEwen & Bui, LLP

(57) ABSTRACT

An information storage medium, and a method and apparatus for recording data on and/or reading data from the same. In the information storage medium, reproduction-dedicated data is recorded as a wobble in a lead-in area, a user data area, or a lead-out area, or any combination thereof, and the reproduction-dedicated data is copied and recorded in the lead-in area and/or the lead-out area.

18 Claims, 5 Drawing Sheets

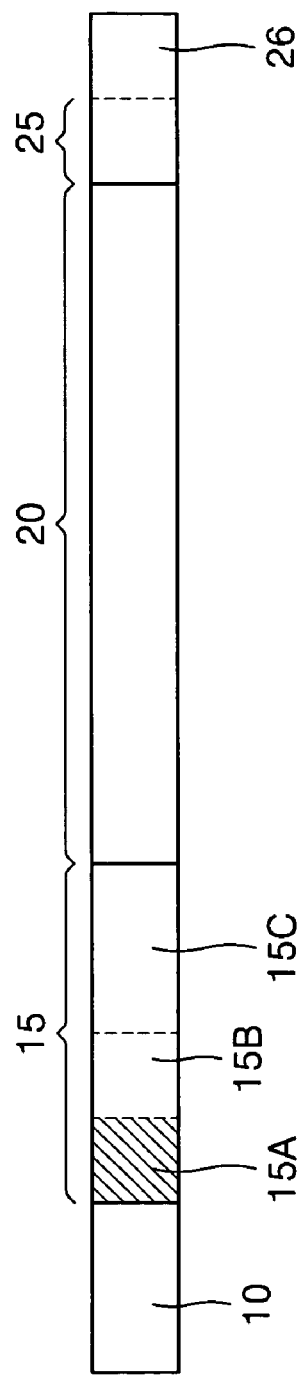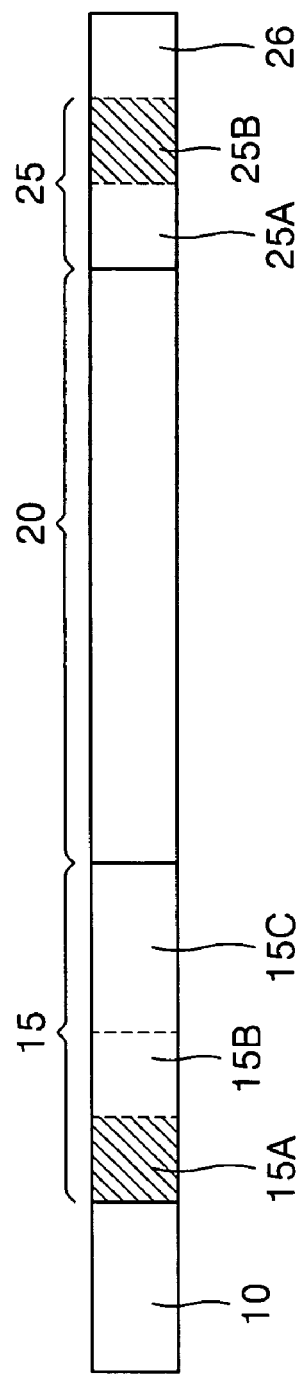

INFORMATION STORAGE MEDIUM AND METHOD AND APPARATUS FOR RECORDING DATA ON AND/OR READING DATA FROM THE SAME

CROSS-REFERENCE TO RELATED APPLICATIONS

This application claims the benefit of Korean Patent Application No. 2003-62682, filed on Sep. 8, 2003, and Korean Patent Application No. 2003-70821, filed on 11 Oct. 2003, in the Korean Intellectual Property Office, the disclosures of which are incorporated herein by reference.

BACKGROUND OF THE INVENTION

1. Field of the Invention

The invention relates to an information storage medium with increased recording capacity achieved by securing as much of a data recording area as possible, and a method and apparatus for recording data on and/or reading data from the medium.

2. Description of the Related Art

An information storage medium is used in optical pickup apparatus that records and/or reproduces information in a non-contact manner. One type of an information storage medium is an optical disk, which can be classified into a compact disk (CD) and a digital versatile disk (DVD), according to information recording capacity. Types of optical disks on which data can be recorded, deleted, and reproduced, include a 650 MB CD-R, a CD-RW, and a 4.7 GB DVD+RW, and the like. Furthermore, an HD-DVD with a recording capacity of over 20 GB is currently being developed.

Demand for information storage media for mobile apparatuses is rapidly increasing. As such, research and development is being conducted to reduce the physical size of information storage mediums. However, there are a number of problems that need be solved in order to reduce the size of an information storage medium, such as compensating for a decrease in the recording capacity due to the smaller size.

FIG. 1A illustrates a layout of a data area in a conventional information storage medium. The conventional information storage medium includes a burst cutting area (BCA) area 10, a lead-in area 15, a user data area 20, and a lead-out area 25.

The lead-in area 15 can include a control data area 15A, an optimal power control (OPC) area 15B, and a disk information area 15c, and the lead-out area 25 can be formed as a buffer area. Also, a non-use area 26 that is made to be unusable in the disk manufacturing process is formed near the outermost perimeter of the information storage medium.

In the control data area 15A, non-variable information, such as a disk size, a version number, and the number of recording layers, is recorded as reproduction-dedicated data. This reproduction-dedicated data is recorded as pits or wobbles. When the reproduction-dedicated data is recorded as wobbles, the data occupies a larger recording area and reproducing it takes more time than when it is recorded as pits.

FIG. 1B illustrates a layout of control data areas disposed both in a lead-in area 15 and a lead-out area 25. In the lead-out area 25, a buffer area 25A and a control data area are disposed.

As the number of control data areas in which reproduction-dedicated data is recorded, or other-purpose areas, disposed in the lead-in area increases, the recording capacity of the user data area decreases. Accordingly, ongoing reduction in the size of the information storage medium necessitates a reduction in the size of the lead-in area and/or the lead-out area.

SUMMARY OF THE INVENTION

The invention provides a storage medium, which has a smaller area than a conventional information storage medium, which is designed to secure as much of a recording area as possible, and a method and apparatus for recording data on and/or reproducing data from the information storage medium.

According to an aspect of the invention, there is provided a recordable information storage medium having a lead-in area, a user data area, and a lead-out area, wherein reproduction-dedicated data is recorded as a wobble in the lead-in area, the user data area, or the lead-out area, or any combination thereof, and the reproduction-dedicated data is copied and recorded in the lead-in area and/or the lead-out area.

The lead-in area, the user data area, and the lead-out area may be all formed as grooves. The lead-in area and the lead-out area may be formed only with recordable area. The copying and recording of the reproduction-dedicated data may be performed when the information storage medium is first placed into a drive. The reproduction-dedicated data may be disk-related data or disk control data.

According to another aspect of the invention, there is provided a method for recording data on and/or reproducing data from a recordable information storage medium having a lead-in area, a user data area, and a lead-out area, the method including: recording reproduction-dedicated data as a wobble in the lead-in area, the user data area, or the lead-out area; or any combination thereof, copying and recording the reproduction-dedicated data in the lead-in area and/or the lead-out area; and when data is recorded on or reproduced from the information storage medium, reproducing the copied and recorded data.

According to another aspect of the invention, there is provided an apparatus for recording data on and/or reproducing data from a recordable information storage medium having a lead-in area, a user data area, and a lead-out area, the apparatus including: a recording/reading unit that records data on or reads data recorded on the information storage medium; and a control unit that controls the recording/reading unit such that reproduction-dedicated data recorded as a wobble in the lead-in area, the user data area, or the lead-out area, or any combination thereof, is copied and recorded in the lead-in area and/or the lead-out area, the reproduction-dedicated data copied and recorded on the information storage medium is read, and user data is recorded and/or reproduced according to the read reproduction-dedicated data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A and 1B illustrate layouts of a data area in a conventional information storage medium;

DETAILED DESCRIPTION OF THE PREFERRED EMBODIMENTS

Figure 2A:
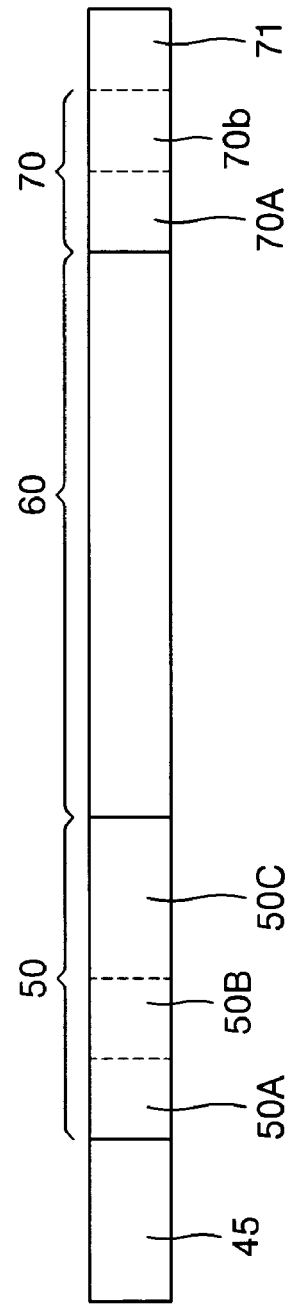
FIG. 2A illustrates a layout of a data area of an information storage medium according to an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 2A, a recordable information storage medium according to an embodiment of the invention includes a lead-in area 50, a user data area 60, and a lead-out area 70, from the inner perimeter of the information storage medium outward. Also, the BCA area 45 can be further disposed near the inner perimeter of the lead-in area 50. As shown in FIG. 2A, the BCA area 45 is disposed inward from the lead-in area 50 and can be formed as pits or grooves.

The lead-in area 50 is a recordable area and includes an optimal power control (OPC) area 50A for testing an optimal recording and/or reproducing power, a reserved area 50B, and a disk information area 50C. The lead-in area 50 does not have an area for recording reproduction-dedicated data.

The reserved area 50B is an area in which no data is recorded when the information storage medium is manufactured, but data can be recorded in it later.

In the disk information area 50C, for example, defect management information, drive-related information, disk information that changes with use of the disk (for example, an address of a data area in which data is recorded last), and updated information such as recording prevention information, can be recorded.

The lead-out area 70 includes a buffer area 70A and a reserved area 70B. A non-use area 71 is located next to the outer perimeter of the lead-out area 70.

The information storage medium according to the invention has a smaller area than a conventional information storage medium, i.e., a small-sized information storage medium, and can be applied to, for example, a mobile apparatus with a diameter of 35 mm or 46 mm. For example, when 4.7 GB of data, corresponding to the capacity of a DVD, is recorded on a disk with a diameter of 46 mm, the disk can be formed according to the following specifications: a minimum mark length of 0.119 µm, an ECC block size of 64 KB, a track pitch of 0.32 µm, an RLL (1,7) modulation method is used, and the start radius of a pick access available area is 8 mm.

The lead-in area 50, the user data area 60, and the lead-out area 70 are all formed as grooves, and the entire area of each is recordable.

Figure 2B:
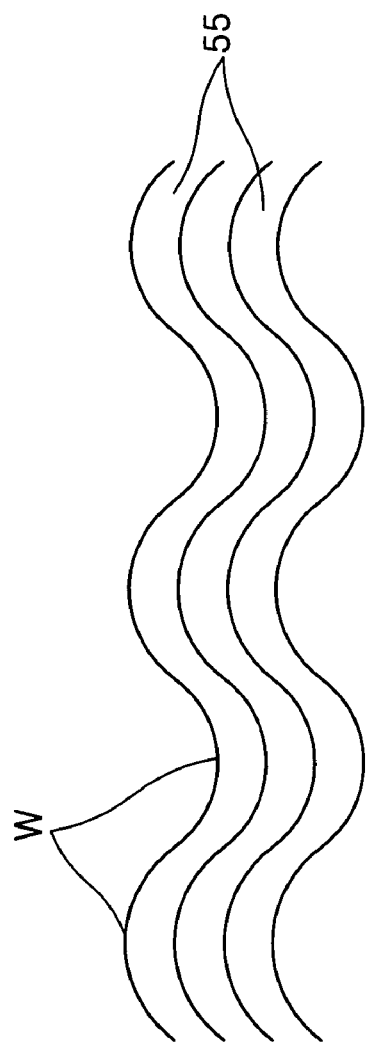
FIG. 2B illustrate information recorded in the form of grooves and wobbles on an information storage medium according to an embodiment of the invention.

Referring to FIG. 2B, in the groove 55 of the lead-in area 50, the user data area 60, or the lead-out area 70, or any combination thereof, a wobble (w) is formed. In the wobble (w), reproduction-dedicated data is recorded. For example, reproduction-dedicated data can be recorded as a groove wobble in the lead-in area 50 or the user data area 60.

Reproduction-dedicated data is, for example, control data or disk-related data. Control data or disk-related data is, for example, invariable disk-related data, such as the size of a disk, a version number, and the number of information storage layers, or recording-related data, such as a recording strategy parameter or a recording speed.

In the invention, since reproduction-dedicated data is recorded in a groove wobble, no separate reproduction-dedicated area is needed.

Meanwhile, the reproduction-dedicated data recorded in the groove wobble can be copied and recorded in the lead-in area 50 and/or the lead-out area 70. That is, when an information storage medium is placed in a data recording and/or reproducing apparatus in order to record/reproduce data thereon, the reproduction-dedicated data recorded in the groove wobble is made to be copied and recorded in the lead-in area 50 or the lead-out area 70. By doing so, when the information storage medium is subsequently used, the copied data can be used to record and/or reproduce data.

Recording information in a recordable area requires less area, and reproducing the information requires less time, than when an equal amount of information is recorded as a groove wobble. Accordingly, compared to reproducing data recorded in the form of a groove wobble, reproducing data copied and recorded in (paged to) the lead-in area or lead-out area reduces the reproduction time.

Copying and recording of the reproduction-dedicated data can be performed when the information storage medium is first placed in the recording and/or reproducing apparatus. After the reproduction-dedicated data is copied and recorded, when the information storage medium is used, data can be recorded and/or reproduced by reproducing the copied and recorded reproduction-dedicated data, without reproducing the data recorded as the groove wobble. Accordingly, information required for recording and/or reproducing data is stored in the smallest area possible and time required for reproducing the information is minimized.

Copying and recording of the reproduction-dedicated data can be performed in the reserved area 50B of the lead-in area 50 or the reserved area 70B of the lead-out area 70. In order to increase reliability of the copied and recorded data, copying and recording can be performed repeatedly. Also, copying and recording can be performed repeatedly in both the lead-in area 50 and the lead-out area 70. By doing so, if the data in one area is damaged by a scratch or fingerprint, the data can be read from the other area.

Figure 3:
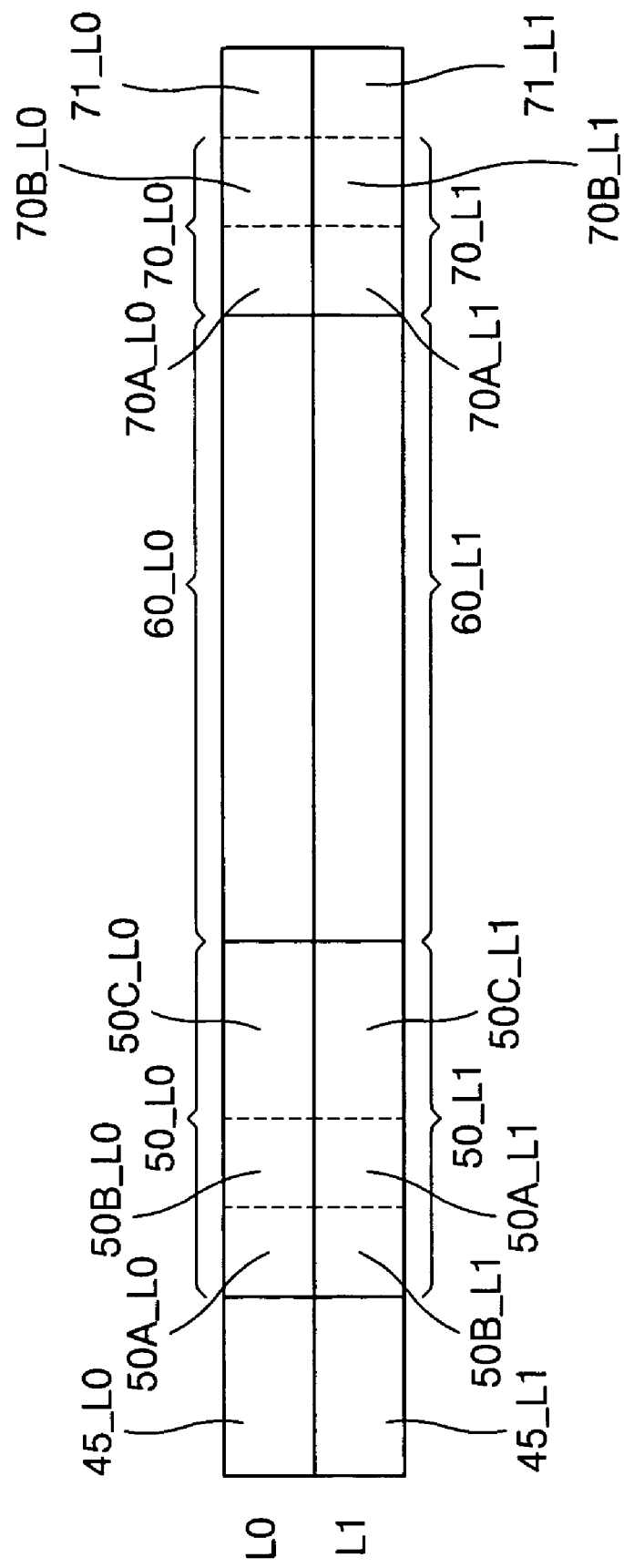
FIG. 3 is a diagram showing a layout of a data area when an information storage medium according to an embodiment of the present invention has an information storage layer formed of 2 layers.

According to another aspect of the invention, the information storage medium has a plurality of information storage layers. FIG. 3 illustrates an information storage medium having a first storage layer (L0) and a second storage layer (L1). Each of the first storage layer (L0) and the second storage layer (L1) includes a BCA area (45_L0, 45_L1), a lead-in area (50_L0, 50_L1), a user data area (60_L0, 60_L1), and a lead-out area (70_L0, 70_L1). Reference numerals 71_L0 and 71_L1 indicate non-use areas. The lead-in area (50_L0, 50_L1) includes an OPC area (50a_L1, 50a_µl), a reserved area (50b_L0, 50b_µl), and a disk information area (50c_L0, 50c_L1), and the lead-out area (70_L0, 70_L1) includes a buffer area (70a_L0, 70b_L1) and a reserved area (70b_L0, 70_L1).

According to an aspect of the invention, the OPC area (50a_L0) in the first information layer and the OPC area (50b_L1) in the second information layer are disposed alternately. That is, with respect to the radius of the information storage medium, the OPC areas (50a_L0, 50a_L1) are disposed at different radiuses. The reason for this is to prevent a possible negative influence on each of the OPC areas (50a_L0, 50a_L1) when the OPC area (50a_L0) in the first information layer and the OPC area (50b_L1) in the second information layer are disposed next to each other, because the OPC operates to determine an optimal write power.

In an information storage medium having a plurality of information storage layers, reproduction-dedication data can be recorded as a groove wobble in each or any one of the information storage layers. The reproduction-dedicated data recorded as a groove wobble is copied and recorded in the lead-in area (50_L0, 50_L1) and/or the lead-out area (70_L0, 70_L1).

When reproduction-dedicated data is recorded as a wobble, the wobble signal is modulated according to a modulation method that is capable of increasing a recording density, and then recorded.

Figure 4:
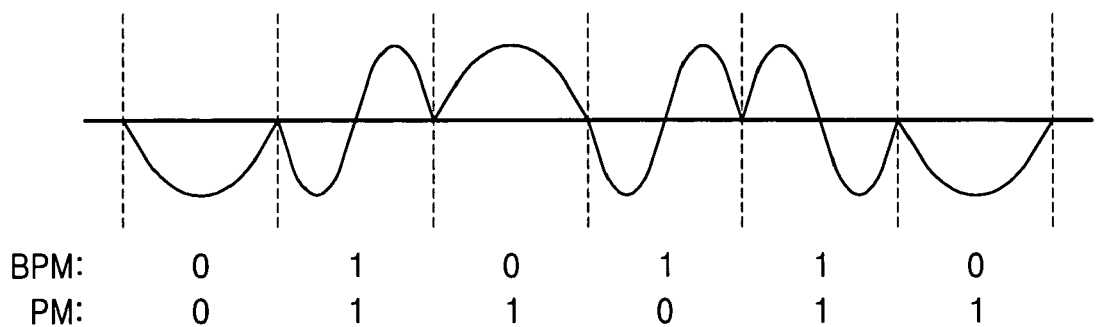
FIG. 4 illustrates a bi-phase modulated or phase-modulated wobble signal.

FIG. 4 is a diagram illustrating a bi-phase modulated or phase-modulated wobble signal. In order to express data bits in the bi-phase modulated wobble signal, data bit "1" is assigned to a wobble signal with a predetermined cycle when the wobble signal crosses zero, and data bit "0" is assigned when the wobble signal does not cross zero.

In order to express data bits in the phase modulated wobble signal, data bit "1" is assigned when the phase change of a wobble signal with a predetermined cycle is 180° at the start point of a next cycle of the wobble signal, and data bit "0" is assigned when the phase is continuous.

A method of recording and/or reproducing data on an information storage medium according to an aspect the invention includes an operation for recording reproduction-dedicated data as a wobble in a groove in the lead-in area, the user data area, or the lead-out area, or any combination thereof, and an operation for copying and recording the reproduction-dedicated data in the lead-in area and/or the lead-out area.

When data is recorded on or reproduced from the information storage medium, the data copied and recorded is reproduced, and according to this reproduction data, recording and/or reproducing of the data is performed. In order to increase reliability of data when the reproduction-dedicated data is copied and recorded, the data can be repeatedly recorded in the lead-on area and/or the lead-out area.

Figure 5:
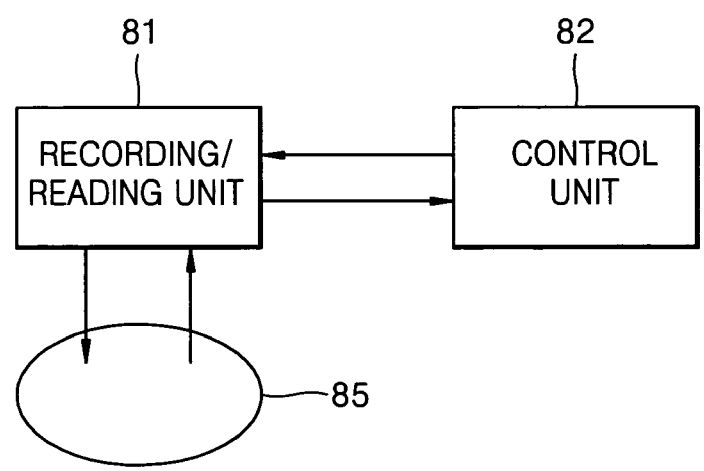
FIG. 5 is a block diagram of a data recording and/or reproducing apparatus according to an embodiment of the invention.

FIG. 5 is a block diagram of a data recording and/or reproducing apparatus according to an aspect of the invention. The apparatus includes a recording/reading unit 81 and a control unit 82. The recording/reading unit 81 records data on a disk 85, which is an information storage medium according to the present invention, and reads recorded data. The control unit 82 controls the recording/reading unit 81 such that reproduction-dedicated data, such as control data or disk-related information, recorded as a groove wobble is copied and recorded in a predetermined area according to the invention, or reproduction-dedicated data copied and recorded on the disk 85 is read and data is recorded on or reproduced from the disk 85 according to the read reproduction-dedicated data.

More specifically, the control unit 82 controls the recording/reading unit 81 such that reproduction-dedicated data recorded as a wobble in the lead-in area, the user data area, or the lead-out area, or any combination thereof, of the disk 85 is copied and recorded in the lead-in area and/or the lead-out area, and the reproduction-dedicated data copied and recorded on the disk 85 is read and user data is recorded and/or reproduced according to the read reproduction-dedicated data.

The control unit 82 may control the recording/reading unit 81 such that copying and recording of the reproduction-dedicated data is performed when the disk 85 is first positioned in the apparatus. In addition, the control unit 82 controls the recording/reading unit 81 such that when the reproduction-dedicated data is copied and recorded, the copying and recording is repeatedly performed.

As described above, the wobble can be either a bi-phase modulated signal or a phase modulated signal. The control unit 82 demodulates the bi-phase modulated wobble or phase-modulated wobble.

Figure 6:
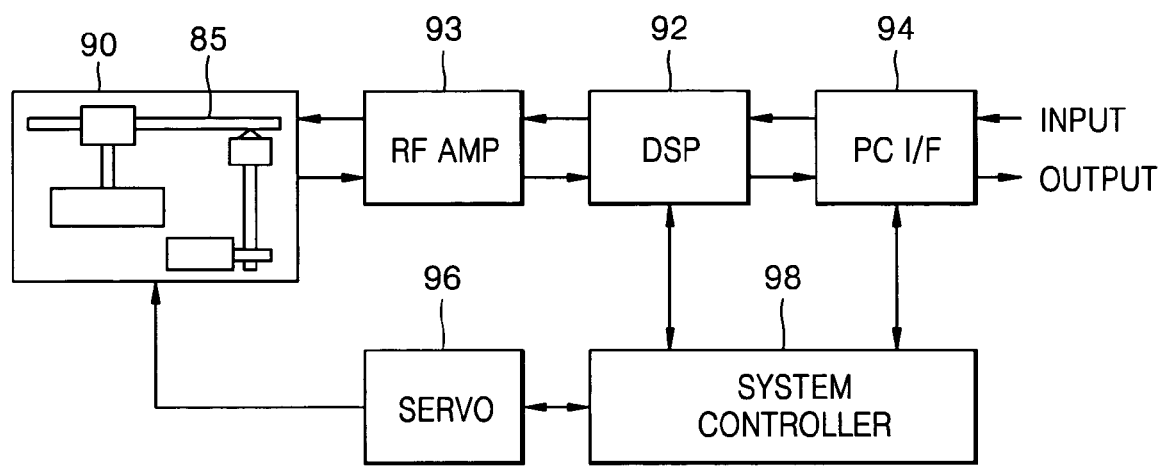
FIG. 6 is a block diagram of a disk drive in which the apparatus of FIG. 5 is implemented.

FIG. 6 is a block diagram of a disk drive in which the apparatus of FIG. 5 is implemented. Referring to FIG. 6, the disk drive includes a pickup 90 as the recording/reading unit 81. The disk 85 is placed at the pickup 90. Also, the disk drive has a PC I/F 94, a digital signal processor (DSP) 92, an RF AMP 93, a servo 96, and a system controller 98, as the control unit 82.

When data is recorded, the PC I/F 94 receives a record command together with data to be recorded from a host (not shown). The system controller 98 performs initialization required for recording data. That is, information required for initialization, such as control data or disk-related data recorded in a lead-in area is read and recording and/or reproduction data is prepared based on the read information.

The DSP 92 performs ECC encoding of the data to be recorded, which is received through the PC I/F 94, by adding additional data such as a parity, for error correction, and modulates the ECC encoded data according to a predetermined method. The RF AMP 93 converts the data output from the DSP 92 into an RF signal. The pickup 90 records the RF signal output from the RF AMP 93 on the disk 85. The servo 96 receives a command required for servo control from the system controller (SYSTEM CONTROLLER) 98 and servo-controls the pickup 90. When reproduction speed information is not recorded in advance on the disk 85, the system controller 98 commands the pickup 90 to record reproduction speed information in a predetermined area of the disk 85, at a time when data recording begins, during data recording, or after data recording is finished.

When data is reproduced, the PC I/F 94 receives a reproduction command from the host (not shown). The system controller 98 performs initialization required for reproduction. At this time, the system controller 98 reads control data or disk-related data recorded on the disk 85 according to the present invention, and according to this data, performs recording and/or reproduction. The pickup 85 irradiates the disk 85 with a laser beam, receives a reflected beam, and outputs an optical signal.

The RF AMP 93 converts the optical signal output from the pickup 90 into an RF signal, provides modulated data obtained from the RF signal to the DSP 92, and provides a servo signal obtained from the RF signal to the servo 96 for control. The DSP 92 demodulates the modulated data and outputs data obtained through ECC error correction.

The servo receives the servo signal from the RF AMP 93 and a command required for servo control from the system controller 98, and performs servo control on the pickup 90. The PC I/F 94 sends data received from the DSP 92 to the host.

As described above, without preparing a separate area for recording reproduction-dedicated data, such as control data or disk-related data, the data is recorded in the form of a groove wobble and this data is copied and recorded such that less area is used to store reproduction-dedicated data and information can be reproduced quickly.

According to the invention, no separate area for reproduction-dedicated data is needed, such that a recording area for recording user data can be maximized. Accordingly, the present invention is applicable to small information storage media. Also, the reproduction-dedicated data recorded as a groove wobble is again copied and recorded, and by using the copied and recorded data, data recording and reproduction is performed such that the reproduction-dedicated data can be quickly reproduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information storage medium having a lead-in area, a user data area, and a lead-out area, wherein reproduction-dedicated data is recorded as a wobble in the lead-in area, the user data area, or the lead-out area, or any combination thereof, and the reproduction-dedicated data is copied and recorded in the lead-in area and/or the lead-out area,
wherein the information storage medium includes a plurality of information storage layers and the reproduction-dedicated data is copied and recorded in only one of the plurality of information storage layers.

2. The information storage medium as claimed in claim 1, wherein the lead-in area, the user data area, and the lead-out area are formed as grooves.

3. The information storage medium as claimed in claim 1, wherein the copying and recording of the reproduction-dedicated data is performed when the information storage medium is placed into a drive.

4. The information storage medium as claimed in claim 1, wherein the reproduction-dedicated data is repeatedly recorded.

5. The information storage medium as claimed in claim 1, wherein the reproduction-dedicated data is repeatedly recorded in the lead-in area and/or the lead-out area.

6. The information storage medium as claimed in claim 1, wherein the reproduction-dedicated data is disk-related data and/or disk control data.

7. The information storage medium as claimed in claim 1, wherein the wobble is bi-phase modulated.

8. The information storage medium as claimed in claim 1, wherein the wobble is phase modulated.

9. A method of recording data on and/or reproducing data from a recordable information storage medium having a lead-in area, a user data area, and a lead-out area, the method comprising:
recording reproduction-dedicated data as a wobble in the lead-in area, the user data area, or the lead-out area, or any combination thereof;
copying and recording the recorded reproduction-dedicated data in the lead-in area and/or the lead-out area; and
reproducing the copied and recorded reproduction-dedicated data from the information storage medium,
wherein the recordable information storage medium includes a plurality of information storage layers and the reproduction-dedicated data is recorded in each of the plurality of information storage layers.

10. The method as claimed in claim 9, wherein the copied and recorded reproduction-dedicated data is repeatedly copied and recorded in the information storage medium.

11. The method as claimed in claim 9, wherein the reproduction-dedicated data is recorded in a groove of the lead-in area, the user data area, or the lead-out area, or any combination thereof.

12. The method as claimed in claim 9, wherein the wobble is bi-phase modulated.

13. The method as claimed in claim 9, wherein the wobble is phase modulated.

14. An apparatus for recording data on and/or reproducing data from a recordable information storage medium having a lead-in area, a user data area, and a lead-out area, the apparatus comprising:
a recording/reading unit that records data on/reads data recorded on the information storage medium; and
a control unit that controls the recording/reading unit such that reproduction-dedicated data recorded as a wobble in the lead-in area, the user data area, or the lead-out area, or any combination thereof, is copied and recorded in the lead-in area and/or the lead-out area, the reproduction-dedicated data copied and recorded on the information storage medium is read, and user data is recorded and/or reproduced according to the read reproduction-dedicated data,
wherein the recordable information storage medium includes a plurality of information storage layers and the reproduction-dedicated data is recorded in each of the plurality of information storage layers.

15. The apparatus as claimed in claim 14, wherein the control unit controls the recording/reading unit such that when the reproduction-dedicated data is copied and recorded, the reproduction-dedicated data is repeatedly copied and recorded.

16. The apparatus as claimed in claim 14, wherein the wobble is a bi-phase modulated signal and the control unit demodulates the bi-phase modulated wobble.

17. The apparatus as claimed in claim 14, wherein the wobble is a phase modulated signal and the control unit demodulates the phase modulated wobble.

18. An information storage medium having a lead-in area, a user data area, and a lead-out area, wherein reproduction-dedicated data is recorded as a wobble in the lead-in area, the user data area, or the lead-out area, or any combination thereof, and the reproduction-dedicated data is copied and recorded in the lead-in area and/or the lead-out area, wherein the information storage medium includes a plurality of information storage layers and the reproduction-dedicated data is recorded in each of the plurality of information storage layers.

* * * * *